(12) United States Patent
Brockman

(10) Patent No.: US 9,821,691 B2
(45) Date of Patent: Nov. 21, 2017

(54) RATCHETING ARMREST ASSEMBLY FOR A VEHICLE

(71) Applicant: WINDSOR MACHINE AND STAMPING (2009) LTD., Windsor (CA)

(72) Inventor: Mark Anthony Brockman, Belle River (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 0 days.

(21) Appl. No.: 15/155,826

(22) Filed: May 16, 2016

(65) Prior Publication Data

US 2016/0347215 A1 Dec. 1, 2016

Related U.S. Application Data

(60) Provisional application No. 62/167,361, filed on May 28, 2015.

(51) Int. Cl.
| | | |
|---|---|---|
| *A47C 7/54* | (2006.01) | |
| *B60N 2/46* | (2006.01) | |
| *B60N 2/44* | (2006.01) | |

(52) U.S. Cl.
CPC ......... *B60N 2/4445* (2013.01); *B60N 2/4606* (2013.01); *B60N 2/4633* (2013.01)

(58) Field of Classification Search
CPC ... B60N 2/4445; B60N 2/4606; B60N 2/4633

(Continued)

(56) References Cited

U.S. PATENT DOCUMENTS 4,230,414 A * 10/1980 Cheshire ................. A47C 1/03
 297/411.32 X
4,655,501 A * 4/1987 Ishigami ............. B60N 2/4613
 297/411.32 X (Continued)

FOREIGN PATENT DOCUMENTS

| DE | 19840808 A1 | 3/2000 |
| JP | H0824077 A | 1/1996 |
| JP | 3463767 B2 | 11/2003 |

OTHER PUBLICATIONS

Search Report regarding related EP App. No. 16170987.8; dated Oct. 31, 2016; 5 pgs.

*Primary Examiner* — Rodney B White
(74) *Attorney, Agent, or Firm* — Cantor Colburn LLP

(57) ABSTRACT

A ratcheting armrest assembly includes an articulating frame assembly. Also included is a ratchet anchor operatively coupled to the articulating frame assembly for rotation with the articulating frame assembly. Further included is an anchor assembly operatively coupled to the articulating frame assembly. Yet further included is a ratchet operatively coupled to the anchor assembly. The ratchet includes a first plurality of teeth and the ratchet anchor including a second plurality of teeth, wherein the first plurality of teeth and the second plurality of teeth are engageable with each other, the second plurality of teeth free to rotate relative to the first plurality of teeth in a first rotational direction and self-locking with the first plurality of teeth in a second rotational direction. Also included is a directional spring biasing the ratchet in the second direction in a first orientation and in the first direction in a second orientation.

9 Claims, 5 Drawing Sheets

(58) Field of Classification Search
USPC .................................................. 297/411.32
See application file for complete search history.

(56) References Cited

U.S. PATENT DOCUMENTS

| | | | | |
|---|---|---|---|---|
| 5,489,143 A * | 2/1996 | Adachi | ................ | B60N 2/4633 297/411.32 |
| 5,597,209 A * | 1/1997 | Bart | ..................... | B60N 2/4633 297/411.32 |
| 5,702,157 A * | 12/1997 | Hurite | ................. | B60N 2/4633 297/411.32 |
| 5,984,416 A * | 11/1999 | Waldo | ....................... | A47C 1/03 297/411.32 |
| 6,467,847 B2 * | 10/2002 | Bidare | ................. | B60N 2/4633 297/411.32 X |
| 6,609,758 B1 * | 8/2003 | Lefevere | .............. | B60N 2/4626 297/367 R |
| 7,284,799 B2 * | 10/2007 | Chung | ................. | B60N 2/4633 297/411.32 |
| 8,702,174 B2 * | 4/2014 | Pacolt | ................. | B60N 2/4633 297/411.38 |
| 8,876,212 B2 * | 11/2014 | Yamada | ................... | B60N 2/02 297/411.32 X |
| 2007/0241603 A1 | 10/2007 | Otto | | |

* cited by examiner

US 9,821,691 B2

RATCHETING ARMREST ASSEMBLY FOR A VEHICLE

CROSS REFERENCE TO RELATED APPLICATION

This patent application claims priority to U.S. Provisional Patent Application Ser. No. 62/167,361, filed May 28, 2015, which is incorporated herein by reference in its entirety.

BACKGROUND OF THE DISCLOSURE

The subject matter disclosed herein relates to moveable armrests and, more particularly, to a ratcheting armrest assembly.

Many vehicles, such as automobiles, include an armrest adjacent an occupant's seat. Armrests are typically cushioned for comfort, may be pivotably adjustable, and may be finished in the same material as the rest of the seat. When travelling in an automobile, a properly adjusted armrest can increase the comfort of a user, thereby improving the user's perception of overall quality of a vehicle. Unfortunately, adjustment of armrests is often cumbersome and potentially discouraging for an occupant to make the proper adjustment.

BRIEF DESCRIPTION OF THE DISCLOSURE

According to one aspect of the disclosure, a ratcheting armrest assembly includes an articulating frame assembly. Also included is a ratchet anchor operatively coupled to the articulating frame assembly for rotation with the articulating frame assembly. Further included is an anchor assembly operatively coupled to the articulating frame assembly. Yet further included is a ratchet operatively coupled to the anchor assembly. The ratchet includes a first plurality of teeth and the ratchet anchor including a second plurality of teeth, wherein the first plurality of teeth and the second plurality of teeth are engageable with each other, the second plurality of teeth free to rotate relative to the first plurality of teeth in a first rotational direction and self-locking with the first plurality of teeth in a second rotational direction. Also included is a directional spring biasing the ratchet in the second direction in a first orientation and in the first direction in a second orientation.

According to another aspect of the disclosure, a method of assembling a ratcheting armrest assembly for a vehicle is provided. The method includes disposing a pivot pin of an anchor assembly through an aperture defined by an articulating frame assembly, the pivot pin extending along an axis of rotation of the articulating frame assembly. The method also includes coupling a ratchet to the anchor assembly by inserting a first portion of the ratchet into a first recess of a ratchet housing and a second portion of the ratchet into a second recess of the ratchet housing. The method further includes coupling a ratchet anchor to the articulating frame assembly, the ratchet including a first plurality of teeth and the ratchet anchor including a second plurality of teeth, wherein the first plurality of teeth and the second plurality of teeth are engageable with each other, the second plurality of teeth free to rotate relative to the first plurality of teeth in a first rotational direction and self-locking with the first plurality of teeth in a second rotational direction. The method yet further includes coupling a directional spring to the ratchet to bias the ratchet in the second direction in a first orientation and in the first direction in a second orientation.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Figure 1:
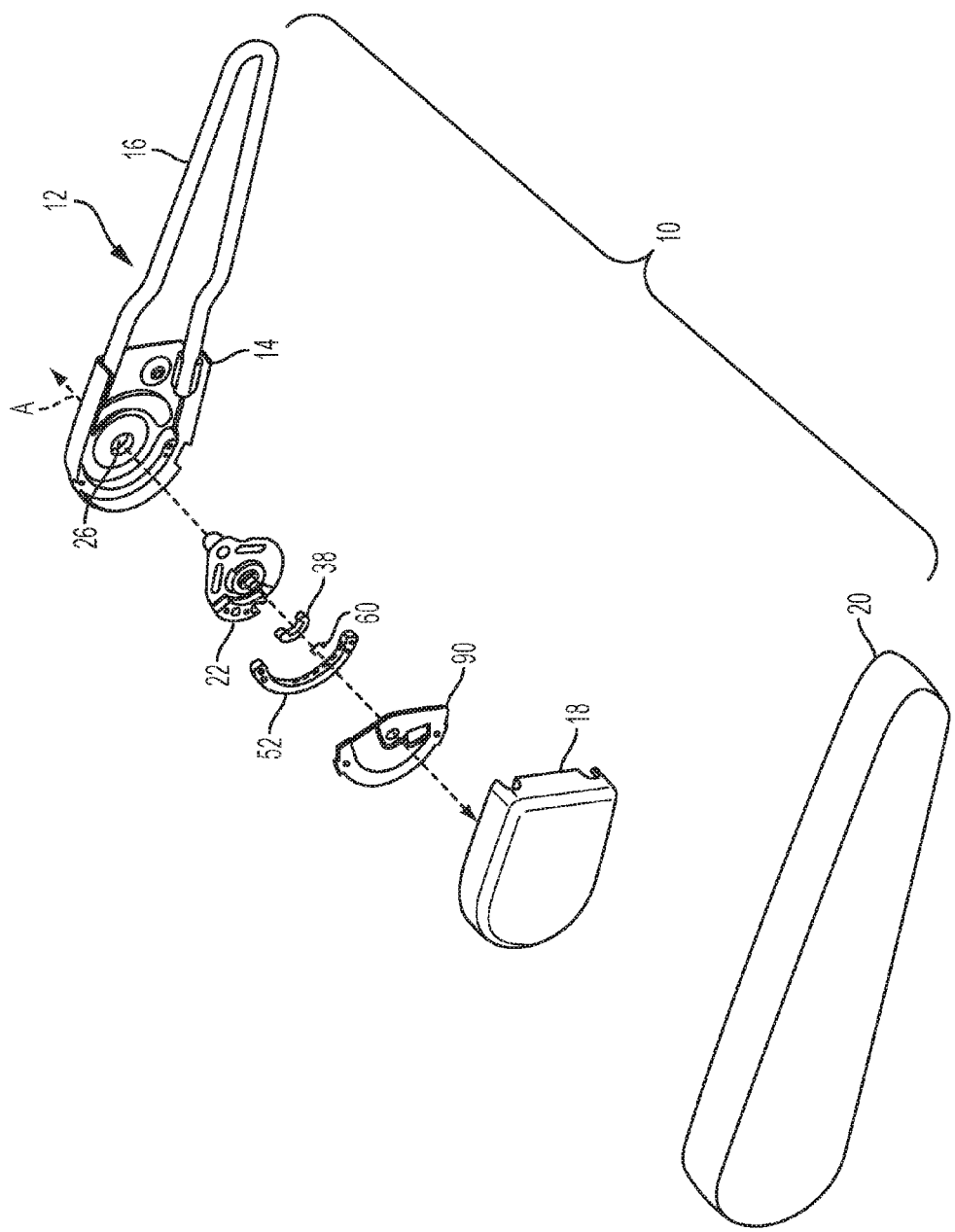
FIG. 1 is a disassembled view of a ratcheting armrest assembly.

Referring to FIG. 1, a ratcheting armrest assembly 10 is illustrated in a disassembled view. The ratcheting armrest assembly 10 is configured to be operatively coupled to a seat. In some embodiments, the ratcheting armrest assembly 10 is coupled to a vehicle seat (not illustrated), but it is to be appreciated that the embodiments disclosed herein may be employed in conjunction with any type of seat.

The ratcheting armrest assembly 10 includes an articulating frame assembly 12 that is pivotable about an axis A. The articulating frame assembly 12 includes a base frame portion 14 and at least one rod 16 extending therefrom. The articulating frame assembly 12 provides a structure to which other components are coupled to and substantially corresponds to the overall shape of the ratcheting armrest assembly 10. Several ratcheting and anchoring components that will be described in detail below are operatively coupled to the base frame portion 14 of the articulating frame assembly 12. The ratcheting and anchoring components are at least partially enclosed between the base frame portion 14 and a mechanism cover 18. The mechanism cover 18 is operatively coupled to the base frame portion 14. In some embodiments, mechanical fasteners such as bolts, screws, or the like are employed to secure the mechanism cover 18 to the base frame portion 14, however, it is to be understood that any suitable coupling process may be employed. The mechanism cover 18, the ratcheting and anchoring components, and the articulating frame assembly 12 are surrounded by an armrest cover 20 that forms an outer surface of the ratcheting armrest assembly 10, which the user directly interacts with.

Figure 2:
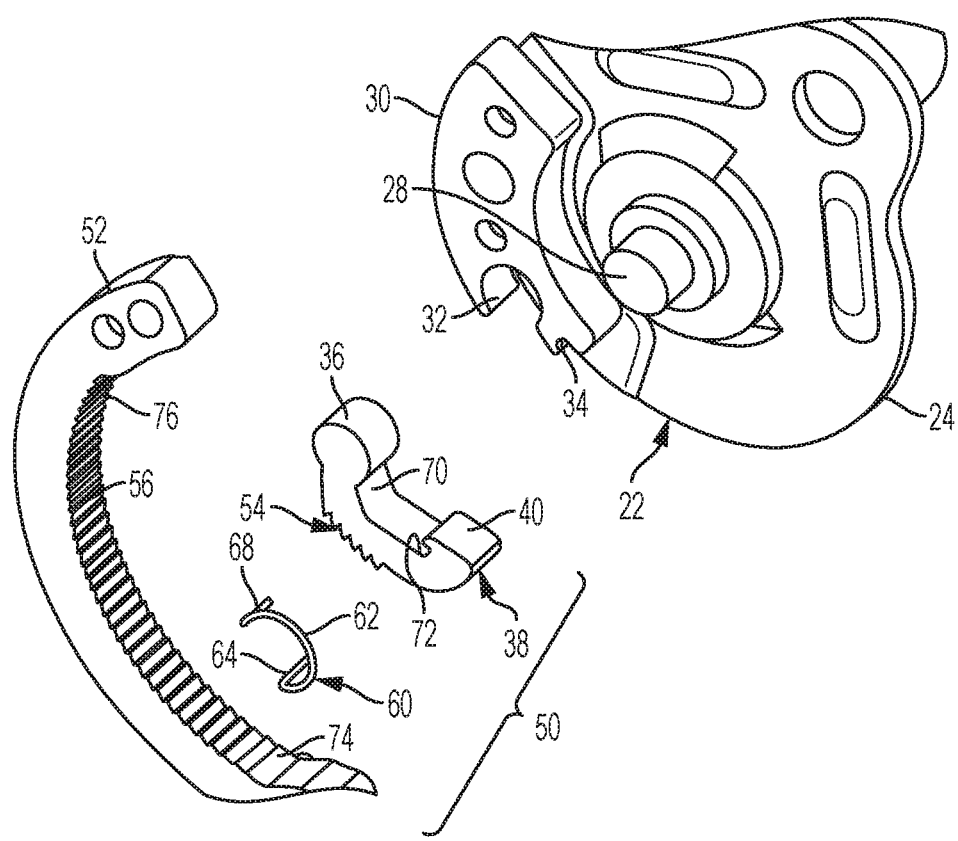
FIG. 2 is an enlarged, disassembled view of Section II of FIG. 1.
Figure 3:
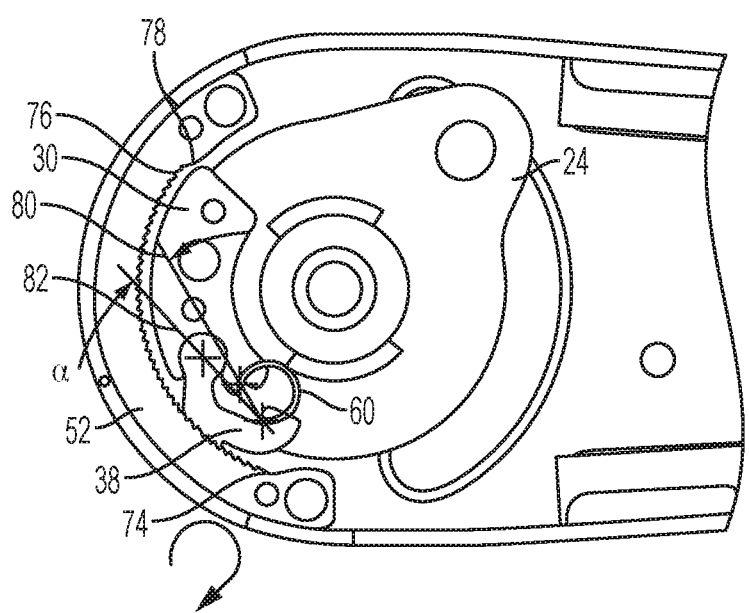
FIG. 3 is an elevational view of the ratcheting armrest assembly in an engaged first position, the assembly rotating in a first direction.

Referring now to FIGS. 2 and 3, with continued reference to FIG. 1, the ratcheting armrest assembly 10 includes an anchor assembly 22. The anchor assembly 22 is formed of an anchor main plate 24 with an aperture extending therethrough and aligned coaxially with pivot axis A. A pivot pin 28 that is coupled to the anchor main plate 24, or integrally formed therewith, extends through the aperture and through an aperture 26 defined by the base frame portion 14 of the articulating frame assembly 12. The pivot pin 28 pivotally couples the anchor assembly 22 to the articulating frame assembly 12. A ratchet housing 30 is operatively coupled to, or integrally formed with, the anchor main plate 24. The ratchet housing 30 includes a first recess 32 and a second recess 34. The first recess 32 is sized to receive a first portion 36 of a ratchet 38 and the second recess 34 is sized to receive a second portion 40 of the ratchet 38. Conversely, it is contemplated that the ratchet housing 30 includes protrusions that are fittingly received within recesses of the ratchet 38. Irrespective of the precise configuration, the ratchet 38 is fixed to the anchor assembly 22 via the ratchet housing 30.

The ratchet 38 is part of a locking mechanism assembly 50 that selectively locks the ratcheting armrest assembly with respect to the overall seat to which it is operatively coupled, thereby preventing rotation of the ratcheting armrest assembly 10. The locking mechanism assembly 50 is configured such that a vehicle user or occupant can adjust the rotational (i.e., angular) position of the ratcheting armrest assembly relative to the seat to optimize comfort. More specifically, the locking mechanism assembly 50 selectively locks the ratcheting armrest assembly 10 in any one of a plurality of different rotational positions.

The locking mechanism assembly 50 includes the above-described ratchet 38 and a ratchet anchor 52. The ratchet 38 includes an arcuate-shaped surface having a first plurality of teeth 54. The ratchet anchor 52 is operatively coupled to the base frame portion 14 of the articulating frame assembly 12 in a fixed manner that allows it to rotate with the articulating frame assembly 12 relative to the anchor assembly 22. The ratchet anchor 52 includes an arcuate-shaped surface having a second plurality of teeth 56.

The ratchet 38 and the ratchet anchor 52 are arranged such that, when the armrest assembly 10, including the ratchet anchor 52, is rotated counterclockwise (e.g., upwardly) in the illustrated embodiment about axis A relative to the anchor assembly 22, the ratchet anchor 52 slides across the ratchet 38, and, more specifically, the second plurality of teeth 56 slides across the first plurality of teeth 54. The teeth 54, 56 are not self-locking in the upward direction; that is, the teeth 54, 56 do not prevent rotation of the armrest assembly 10 about axis A in the upward direction. As the ratchet anchor 52 slides across the ratchet 38, the second plurality of teeth 56 force the first plurality of teeth 54 away from the ratchet anchor 52 as each of the teeth 56 traverses over a respective one of the teeth 54 until further rotation causes each of the teeth 56 to rest in respective spaces between the teeth 54.

The teeth 54, 56 are self-locking in the clockwise (e.g., downward) rotational direction about axis A. That is, a force exerted on the armrest assembly 10 urging the armrest to rotate in the downward direction about axis A will not result in rotation of the armrest assembly 10 because the teeth 54, 56 will be locked and prevent such movement. However, as noted above, when a force is exerted on the armrest assembly 10 urging the armrest to rotate about axis A in an upward rotational direction, teeth 56 will slide across teeth 54, thereby permitting the armrest assembly 10 to rotate.

As described above, the armrest assembly 10 is prevented from rotating downwardly due to the self-locking arrangement of the ratchet 38 and ratchet anchor 52. The ratchet 38 is biased into engagement with the ratchet anchor 52 based on a force exerted on the ratchet 38 with a directional spring 60. The directional spring 60 includes a curved main portion 62 and first and second legs 64, 68 extending therefrom in a direction substantially parallel to axis A. The second leg 68 of the spring 60 is disposed along a first portion 70 of the ratchet 38 and the first leg 64 is disposed within a recess 72 of the ratchet 38. Over the range between a first end 74 of the ratchet anchor teeth 56 and a second end 76 of the ratchet anchor teeth 56, the spring 60 biases the ratchet 38 toward the ratchet anchor 52, as shown in FIG. 3. The force direction of the spring 60 is dictated by an angle defined by two axes. A first axis 80 extends through the respective end locations of the first and second legs 64, 68 of the spring 60. The second axis 82 extends through the end location of the first leg 64 and an axis extending centrally through the first portion 40 of the ratchet 38. This defines an angle $\alpha$.

Figure 4:
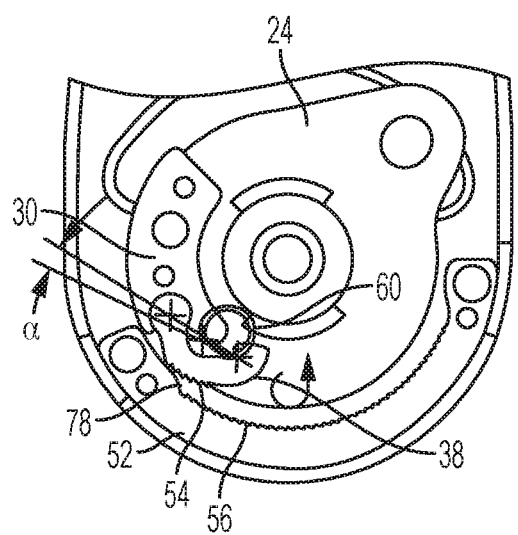
FIG. 4 is an elevational view of the ratcheting armrest assembly in a disengaged second position, the assembly rotating in the first direction.

Referring to FIG. 4, upon reaching the second end 76 of the ratchet anchor teeth 56, the ratchet 38 engages a cam 78 of the ratchet anchor 52 that manipulates the orientation of the ratchet 38 to cross axis 82 over axis 80, thereby modifying angle $\alpha$ to an extent necessary to switch the directional force of the spring 60. Upon reaching this critical angle, the spring 60 biases the ratchet 38 away from the ratchet anchor 52 to a disengaged condition. In the disengaged condition shown in FIG. 4, the teeth 54, 56 are not engaged and clearance is provided therebetween. This condition allows the armrest assembly 10 to be freely rotated downwardly.

Figure 5:
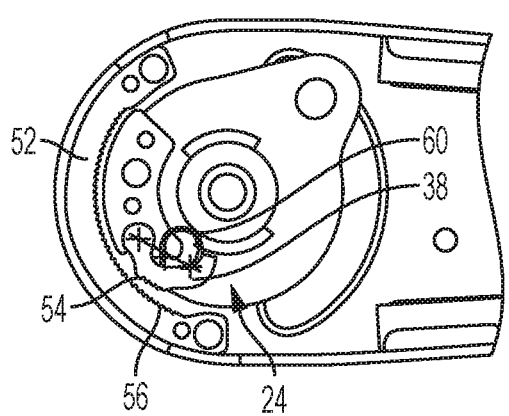
FIG. 5 is an elevational view of the ratcheting armrest assembly in a disengaged first position, the assembly rotating in a second direction.
Figure 6:
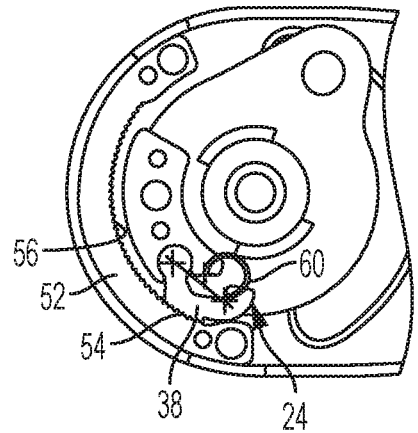
FIG. 6 is an elevational view of the ratcheting armrest assembly in an engaged second position, the assembly rotating in the second direction.

Referring now to FIGS. 5 and 6, re-engagement of the ratchet 38 with the ratchet anchor 52 is illustrated. In particular, FIG. 5 shows the armrest assembly 10 in first position as it approaches the first end 74 of the ratchet anchor teeth 56. In this position, the teeth 54, 56 are still disengaged with clearance therebetween. In FIG. 6, re-engagement is achieved upon contact between the ratchet 38 and a cover plate 90 (FIG. 1). Specifically, the ratchet 38 contacts a cam extending from the cover plate 90. The cam manipulates the ratchet 38 to an orientation that switches the force direction of the spring 60, which has been described in detail above. This forces re-engagement of the teeth 54, 56, allowing a user to leave the armrest assembly 10 in the downward-most position or maneuver it upwardly to a desired angle. In some embodiments, the cam comprises a bent steel tab.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A ratcheting armrest assembly comprising:
   an articulating frame assembly;
   a ratchet anchor operatively coupled to the articulating frame assembly for rotation with the articulating frame assembly;
   an anchor assembly operatively coupled to the articulating frame assembly;
   a ratchet operatively coupled to the anchor assembly;
   the ratchet including a first plurality of teeth and the ratchet anchor including a second plurality of teeth, wherein the first plurality of teeth and the second plurality of teeth are engageable with each other, the second plurality of teeth free to rotate relative to the first plurality of teeth in a first rotational direction and self-locking with the first plurality of teeth in a second rotational direction;

a directional spring biasing the ratchet in the second direction in a first orientation and in the first direction in a second orientation, the directional spring being operatively coupled to the ratchet, the directional spring comprising a curved main portion, a first leg and a second leg;

a first angle defining axis extending through respective ends of the first leg and the second leg; and a second angle defining axis extending through the end of the first leg and an axis extending centrally through a first portion of the ratchet.

2. The ratcheting armrest assembly of claim 1, wherein the anchor assembly is operatively coupled to the frame assembly via a pivot pin extending through an aperture of the articulating frame assembly and along an axis of rotation of the articulating frame assembly.

3. The ratcheting armrest assembly of claim 2, wherein the frame assembly rotates relative to the anchor assembly.

4. The ratcheting armrest assembly of claim 1, wherein the anchor assembly includes a ratchet housing, the ratchet coupled to the ratchet housing.

5. The ratcheting armrest assembly of claim 4, wherein the ratchet housing includes a first recess retaining a first portion of the ratchet and a second recess retaining a second portion of the ratchet.

6. The ratcheting armrest assembly of claim 1, wherein the second leg is in contact with a surface of the ratchet and the first leg is disposed within a recess of the ratchet.

7. The ratcheting armrest assembly of claim 1, wherein the first orientation of the directional spring is defined by a positive angle between the first angle defining axis and the second angle defining axis, the second orientation of the directional spring defined by a negative angle between the first angle defining axis and the second angle defining axis.

8. The ratcheting armrest assembly of claim 7, the ratchet anchor including a first cam disposed proximate an end of the second plurality of teeth, wherein contact between the ratchet and the first cam shift the directional spring from the first orientation to the second orientation to provide a clearance between the first plurality of teeth and the second plurality of teeth.

9. The ratcheting armrest assembly of claim 7, further comprising a cover plate disposed between the ratchet anchor and a mechanism cover, the cover plate including a second cam disposed proximate an end of the second plurality of teeth, wherein contact between the ratchet and the second cam shift the directional spring from the second orientation to the first orientation to re-engage the first plurality of teeth and the second plurality of teeth.

\* \* \* \* \*